E. A. BECKER.
MOTOR CYCLE SIGNAL.
APPLICATION FILED APR. 8, 1912.

1,166,652.

Patented Jan. 4, 1916.

Witnesses

Inventor
Emil A. Becker
By Erwin E. Wheeler
Attorney

UNITED STATES PATENT OFFICE.

EMIL A. BECKER, OF MILWAUKEE, WISCONSIN.

MOTOR-CYCLE SIGNAL.

1,166,652.  Specification of Letters Patent.  Patented Jan. 4, 1916.

Application filed April 8, 1912. Serial No. 689,137.

*To all whom it may concern:*

Be it known that I, EMIL A. BECKER, a citizen of the United States, residing at Milwaukee, county of Milwaukee, and State of Wisconsin, have invented new and useful Improvements in Motor-Cycle Signals, of which the following is a specification.

My invention relates to improvements in motor cycle signals.

The object of my invention is to provide a form of signal which may be readily secured to any motor cycle in position for use and operated by the exhaust gases from the engine.

A special object of my invention is to provide a form of construction which can be readily clamped upon the exhaust tube of a motor cycle internal combustion engine, said tube being first provided with an aperture, which is subsequently closed by clamping the signaling mechanism thereon.

Figure 1:
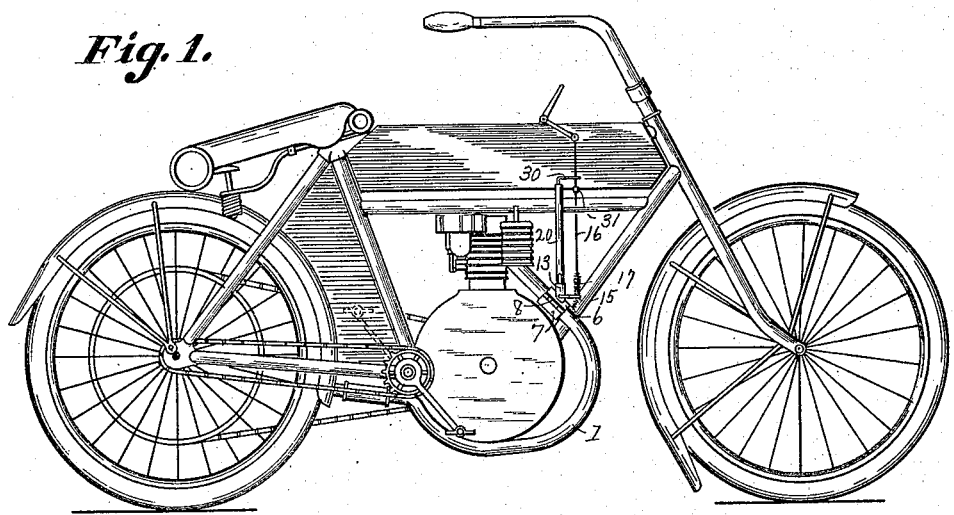
Figure 2:
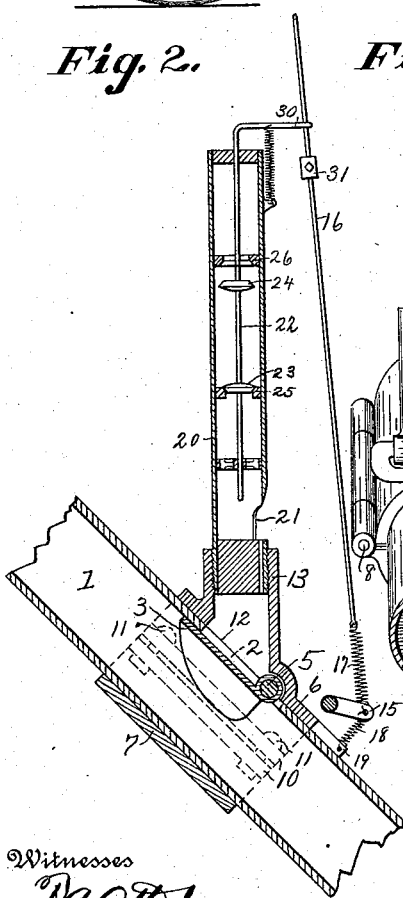
Figure 3:
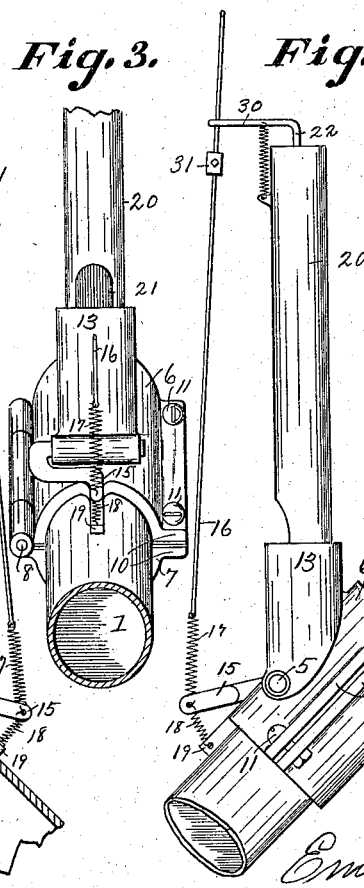
Figure 4:
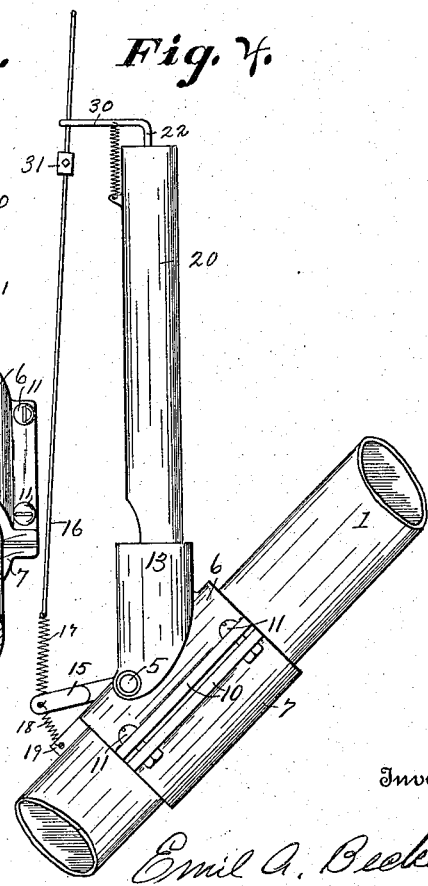

In the drawings Figure 1 is a side view of a motor cycle to which my invention is applied. Fig. 2 is a detail sectional view of a portion of the exhaust pipe with my improved signaling mechanism mounted thereon. Fig. 3 is a detail front view of the same. Fig. 4 is a side elevation of the parts shown in Fig. 2, reversed in position.

Like parts are identified by the same reference characters throughout the several views.

The exhaust pipe 1 of a motor cycle engine is provided with an opening 2, through which a valve 3 may be inserted, said valve being spoon-shape and adapted to fit the interior wall of the tube 1, so as to cover the aperture 2. The valve 3 is pivotally secured at 5 to a semi-cylindrical member 6, to which a counterpart semi-cylindrical member 7 is hinged at 8. The members 6 and 7 are provided with clamping ears 10 adapted to be connected together by bolts 11, whereby said members 6 and 7 may be bound upon the exhaust pipe 1. The member 6 is provided with a port 12, communicating with a branch pipe 13. This port 12 registers with the opening 2 in the pipe 1 when the clamping members 6 and 7 are properly positioned on said pipe 1. It therefore follows that by opening the valve 3, gas will be permitted to pass into the branch duct 13 from said pipe 1. The valve 3 is arranged to open downwardly and partially or wholly across the passage in pipe 1, so as to obstruct the flow of gas therethrough immediately below the opening 2 and direct the gas into branch pipe 13. The hinge pin 5 of valve 3 is extended at one end and bent downwardly and inwardly. This constitutes a lever 15, which may be actuated from any suitable point by a flexible connection 16, having a resilient section 17 which preferably comprises a coiled spring. Another coiled spring 18 connects the lever 15 with a projection 19 on the clamping member 6, whereby said lever will be normally held with valve 3 in closed position.

A signal (preferably a whistle) is connected with the branch pipe 13. The whistle illustrated comprises a tube 20, having a vent at 21. A rod 22 extends through the upper end of the tube 20 and downwardly therein with valves 23 and 24 thereon adapted to fit annular valve seats 25 and 26 respectively. These valves 23 and 24 are so disposed upon the rod 22 that when one of them is in closed position, the other will be in open position. They also permit an intermediate adjustment with both valves in open position, thus allowing for a variation in tone by increasing or decreasing the length of the sounding column of air in the tubular casing 20. The upper end of rod 22 is elbowed, forming a laterally projecting arm 30, which may be loosely attached to the connection 16, which slides through an eye in the arm 30 and operates valve 3. A stop 31 is adjustably mounted upon connection 16 in a position to engage and actuate arm 30 after the connection 16 has moved upwardly to a sufficient extent to open valve 3.

In operation, when it is desired to sound the whistle, connection 16 is pulled upwardly, actuating lever 15 and opening valve 3, whereupon the exhaust gases from the motor will be diverted into the branch pipe 13 and delivered to the whistle tube 20. In this tube, valve 23 will normally be in closed position. By additionally lifting the connection 16, valve 23 will move from its seat, thereby providing an air column equal to the length of whistle tube 20 and changing the tone. Another change of tone may be secured by an additional upward movement, sufficient to bring valve 24 to its seat.

I attach great importance to the means above described for connecting the signal to the exhaust pipe, since I am thus enabled to not only apply my invention to motor cycles in process of construction, but also to apply it to those already in use, it being merely necessary to cut a hole in the exhaust pipe and cover the pipe at that point by the clamping members 6 and 7 properly adjusted thereto.

I claim—

1. The combination with an apertured exhaust pipe of an internal combustion motor, of a set of clamping members adapted to cover the apertured portion of the exhaust pipe and having a branch pipe in position to receive vapor discharged through said aperture, a valve pivotally connected with one of the clamping members and adapted to be manipulated through the exhaust pipe aperture and to close with the pressure upon the inner face of the pipe adjacent to the margin of said aperture, said valve being shaped to fit the curved inner face of the wall of said pipe which serves as a seat, and a signal mounted on said branch pipe.

2. The combination with an exhaust pipe of an internal combustion motor, of a set of semi-cylindrical clamping members embracing said pipe, one of said clamping members being provided with a branch duct and said exhaust pipe being apertured to afford communication with said branch duct, a spoon-shaped valve pivoted to said last named clamping member and located within the exhaust pipe with its margins seating with the pressure upon the wall of the exhaust pipe at the margins of said aperture, a valve operating lever, a flexible actuating connection therefor, and a signal connected with said exhaust duct; said valve being adapted to be manipulated into position in the exhaust pipe through said aperture.

3. The combination with an exhaust pipe of an internal combustion motor, of a set of semi-cylindrical clamping members embracing said pipe, one of said clamping members being provided with a branch duct and said exhaust pipe being apertured to afford communication with said branch duct, a valve pivoted to said last named clamping member and adapted to close the exhaust pipe aperture, said valve being located in said pipe, a valve operating lever, a flexible actuating connection therefor, and a signal connected with said exhaust duct, said signal comprising a whistle tube provided with a vent, a set of valves mounted in said whistle tube and adapted to be adjusted to lengthen or shorten the air column in said tube, a valve actuating stem for the whistle valves, and a device secured to the actuating connections of the exhaust pipe valve in a position to engage and actuate the stem of the whistle valves, substantially as described.

In testimony whereof I affix my signature in the presence of two witnesses.

EMIL A. BECKER.

Witnesses:
LEVERETT C. WHEELER,
IRMA D. BREMER.

Copies of this patent may be obtained for five cents each, by addressing the "Commissioner of Patents, Washington, D. C."